(12) United States Patent
Tracht et al.

(10) Patent No.: US 7,441,797 B2
(45) Date of Patent: Oct. 28, 2008

(54) VEHICLE SEAT ASSEMBLY

(75) Inventors: Michael L. Tracht, Ingolstadt (DE); Johann Musat, Wiesbaden (DE)

(73) Assignee: Lear Corporation, Southfield, MI (US)

( * ) Notice: Subject to any disclaimer, the term of this patent is extended or adjusted under 35 U.S.C. 154(b) by 246 days.

(21) Appl. No.: 11/151,566

(22) Filed: Jun. 13, 2005

(65) Prior Publication Data

US 2006/0279074 A1 Dec. 14, 2006

(51) Int. Cl.
*B60R 21/207* (2006.01)

(52) U.S. Cl. .................................. 280/730.2

(58) Field of Classification Search .............. 280/728.2, 280/728.3, 730.2; 297/216.13
See application file for complete search history.

(56) References Cited

U.S. PATENT DOCUMENTS

| | | | |
|---|---|---|---|
| 5,799,970 A * | 9/1998 | Enders | 280/730.2 |
| 5,816,610 A | 10/1998 | Higashiura et al. | |
| 5,860,673 A | 1/1999 | Hasegawa et al. | |
| 5,938,232 A | 8/1999 | Kalandek et al. | |
| 6,045,151 A | 4/2000 | Wu | |
| 6,237,934 B1 | 5/2001 | Harrell et al. | |
| 6,386,577 B1 * | 5/2002 | Kan et al. | 280/730.2 |
| 6,422,590 B1 * | 7/2002 | Umezawa et al. | 280/728.2 |
| 6,588,838 B1 | 7/2003 | Dick, Jr. et al. | |
| 7,195,277 B2 * | 3/2007 | Tracht et al. | 280/730.2 |

OTHER PUBLICATIONS

U.S. Appl. No. 08/808,572, filed Feb. 28, 1997, Wu et al.

* cited by examiner

*Primary Examiner*—Paul N. Dickson
*Assistant Examiner*—Robert A. Coker
(74) *Attorney, Agent, or Firm*—Brooks Kushman P.C.

(57) ABSTRACT

A seat assembly for a vehicle. The seat assembly includes an air bag module, a bolster frame, and a cushion assembly having a trim cover arrangement. The air bag module and the bolster frame cooperate to define a gap. The trim cover arrangement includes a trim cover having an end portion and a retaining feature disposed proximate the end portion. The retaining feature is disposed in the gap to secure the trim cover arrangement.

20 Claims, 4 Drawing Sheets

VEHICLE SEAT ASSEMBLY

BACKGROUND OF THE INVENTION

1. Field of the Invention

The present invention relates to a vehicle seat assembly having an inflatable air bag.

2. Background Art

Vehicle seat assemblies may be provided with inflatable air bags. U.S. Pat. Nos. 6,045,151 and 6,237,934 disclose examples of such vehicle seat assemblies.

SUMMARY OF THE INVENTION

In at least one embodiment of the present invention, a vehicle seat assembly is provided. The vehicle seat assembly includes a cushion assembly, a bolster frame, and an air bag module. The cushion assembly includes a cushion, a frame, and a trim cover arrangement. The trim cover arrangement includes a trim cover having an end portion and a retaining feature disposed proximate the end portion. The bolster frame is disposed proximate the frame. The air bag module is disposed proximate the bolster frame and cooperates with the bolster frame to define a gap. The retaining feature is disposed in the gap to secure the trim cover arrangement.

In at least one other embodiment, a vehicle seat assembly includes a frame, a bolster frame, an air bag module, and first and second trim cover arrangements. The air bag module is disposed proximate the bolster frame and cooperates with the air bag module to define first and second gaps. The first trim cover arrangement has a first retaining feature disposed proximate an end portion of a first trim cover. The second trim cover arrangement has a second retaining feature disposed proximate an end portion of a second trim cover. The first retaining feature is disposed in the first gap to secure the first trim cover arrangement and the second retaining feature is disposed in the second gap to secure the second trim cover arrangement.

In at least one other embodiment, a vehicle seat assembly is provided that includes a frame, a bolster frame, an air bag module and a trim cover arrangement. The bolster frame is disposed proximate the frame and includes a side portion. The air bag module is disposed proximate the bolster frame and cooperates with the side portion to define a gap. The air bag module also includes an extension portion disposed adjacent to the gap. The trim cover arrangement has a retaining feature disposed proximate an end portion of a trim cover. The retaining feature is disposed in the gap and exerts force on the extension portion to secure the trim cover arrangement.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
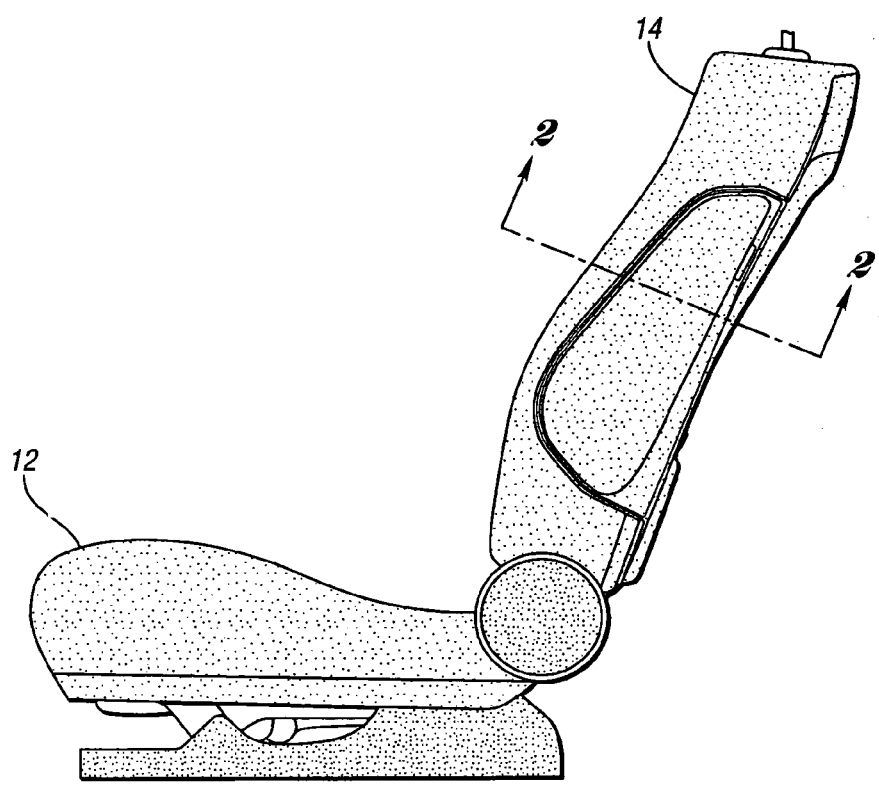
FIG. 1 is a side view of a vehicle seat assembly having an air bag module disposed in a seat back.

Referring to FIG. 1, a seat assembly 10 for a motor vehicle is shown. The seat assembly includes a seat bottom 12 and a seat back 14. The seat bottom 12 is adapted to be mounted on the vehicle. The seat back 14 is disposed proximate the seat bottom 12 and may be adapted to pivot with respect to the seat bottom 12. In addition, the seat back 14 may include a headrest portion for supporting the head of a vehicle occupant.

Figure 2:
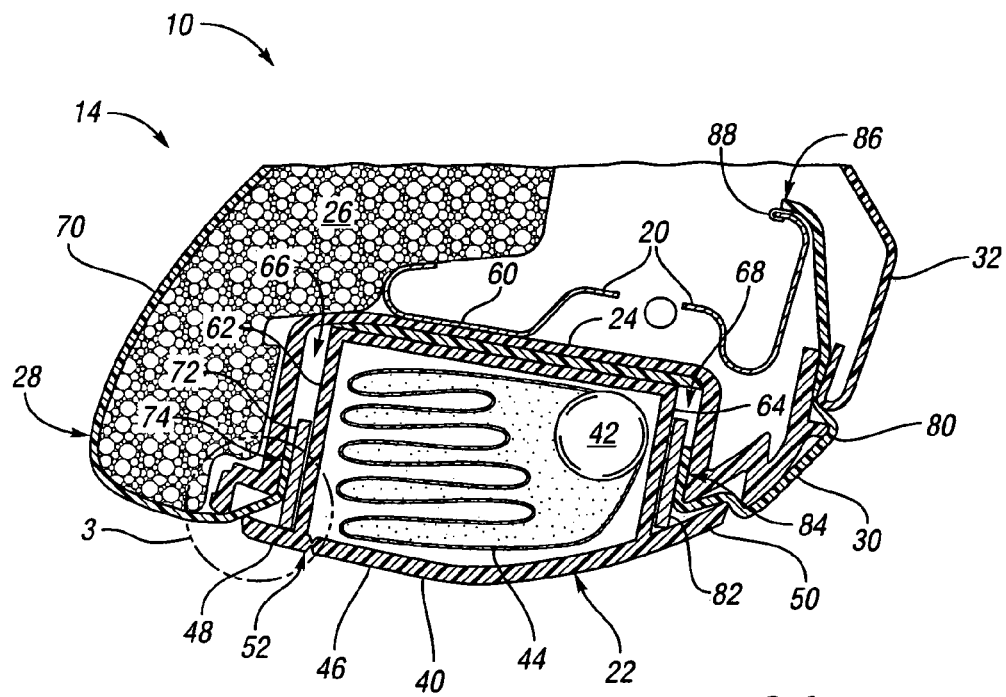
FIG. 2 is a fragmentary section view of a first embodiment of the seat back taken along line 2-2 of FIG. 1.

Referring to FIG. 2, an exemplary embodiment of the seat back 14 is shown in more detail. In the embodiment shown, the seat back 14 includes a frame 20, an air bag module 22, a bolster frame 24, a seat pad 26, a first trim cover arrangement 28, a second trim cover arrangement 30, and a back panel 32.

The frame 20 provides a support structure for the seat back 14. The frame 20 may have any suitable configuration and may be made of any suitable material, such as a polymeric material, metal, or combinations thereof.

The air bag module 22 may have any suitable configuration. In the embodiment shown in FIG. 2, the air bag module includes a housing 40, an inflator 42, and an air bag 44. The air bag module 22 may be disposed in any suitable location. For example, the air bag module 22 may be disposed proximate the frame 20 and/or the bolster frame 24 and may be attached in any suitable manner, such as with one or more fasteners. In the embodiment shown in FIG. 2, the air bag module 22 is disposed proximate the bolster frame 24.

The housing 40 is configured to receive at least a portion of the air bag 44 when the air bag 44 is deflated. The housing 40 may have any suitable configuration. In the embodiment shown in FIG. 2, the housing 40 includes an exterior panel 46 that forms an exterior surface of the seat back 14. The exterior panel 46 may include one or more extension portions that extend from the housing 40. In the embodiment shown, a first extension portion 48 and a second extension portion 50 are provided that may contact the first trim cover arrangement 28 and the second trim cover arrangement 30, respectively.

Figure 3A:
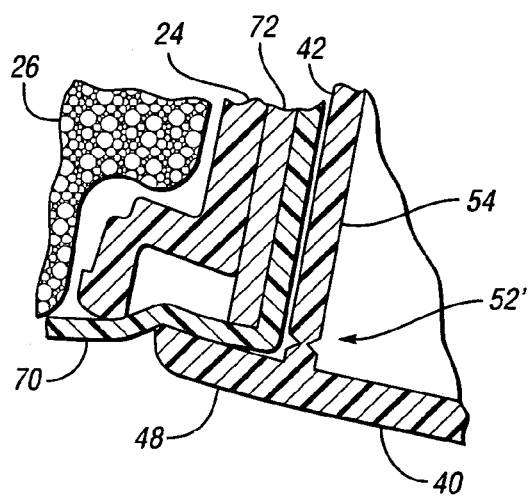
FIGS. 3A and 3B are alternate embodiments of seam portions of the air bag module.
Figure 3B:
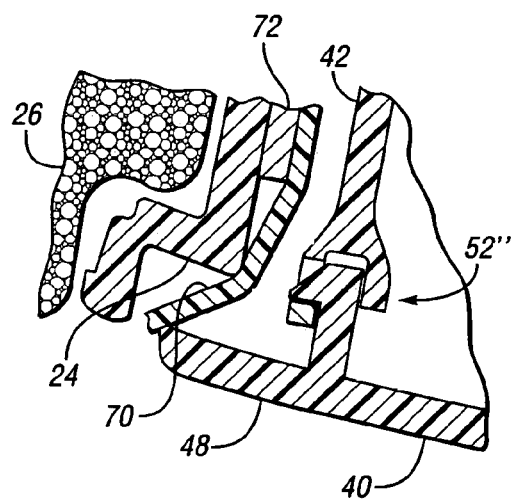

The housing 40 may also include a seam portion 52 that is adapted to break, tear, sever, unsnap, or otherwise disengage in response to force exerted by the air bag 44 when the air bag 44 is inflated. More specifically, the seam portion 52 may be breached by the air bag 44 and the panel 46 may flex or move outwardly when inflation gas is provided to permit the air bag 44 to expand outside the seat assembly 10 to help protect a seat occupant. The seam portion 52 may have any suitable configuration. For instance, the seam portion 52 may be a configured as a tear seam disposed on one or more surfaces of the exterior panel 46 as shown in FIG. 2. In the embodiment shown in FIG. 3A, the seam portion 52' is disposed on one or more surfaces of a side panel 54 of the housing 40. In the embodiment shown in FIG. 3B, the seam portion 52" may be configured with male and female portions that unsnap or disengage from each other in response to force exerted by a deploying air bag. The present invention also contemplates embodiments in which the male and female portions are interchanged from the positions shown in FIG. 3B.

The inflator 42 is adapted to provide an inflation gas to the air bag 44. The inflator 42 may be disposed in any suitable location. In the embodiment shown in FIG. 2, the inflator 42 is disposed within the housing 40. Alternatively, the inflator 42 may be disposed outside the housing 40 and may be connected to the air bag 44 via a tube or other suitable fluid connector.

The air bag 44 is configured to expand from a stored condition to an inflated or deployed condition when the inflation gas is provided. More specifically, the air bag 44 is deflated and concealed by the housing 40 and/or another surface of the seat back 14 when in the stored condition and is inflated and positioned between a seat occupant and an interior vehicle surface when in the inflated condition. In FIG. 2, the air bag 44 is shown in the stored condition.

The air bag 44 may have any suitable configuration and may be made of any suitable material. For example, the air bag 44 may be made of multiple panels that are assembled in any suitable manner, such as by stitching, bonding, or with an adhesive. Alternatively, the air bag 44 may be integrally formed. Optionally, the air bag 44 may include one or more tethers that control the shape of the air bag 44 upon deployment. The air bag 44 may be configured to cushion the head, thorax, and/or pelvis of the seat occupant when deployed.

The bolster frame 24 may be disposed in the seat back 14 and extend at least partially around the housing 40. The bolster frame 24 may be made of any suitable material, such as a polymeric material, metal, or combinations thereof. In addition, the bolster frame 24 may have any suitable configuration. In the embodiment shown, the bolster frame 24 includes a back portion 60 disposed between the housing 40 and the frame 20. The back portion 60 may be mounted to the frame 20 and/or housing 40 in any suitable manner, such as with a fastener or adhesive. The bolster frame 24 also includes first and second portions 62,64 disposed proximate the back portion 60. A first gap 66 may be disposed between the first portion 62 and the housing 40. Similarly, a second gap 68 may be disposed between the second portion 64 and the housing 40. The first and second portions 62,64 may extend to the sides or past the ends of the first and second extension portions 48,50, respectively. As such, the first and second portions 62,64 may support the first and second trim cover arrangements, 28,30, respectively.

The cushion or seat pad 26 may have any suitable configuration and may be made of any suitable material, such as a molded polymeric material like polyurethane foam. In the embodiment shown, the seat pad 26 is disposed proximate the frame 20 and may be attached to the frame 20 at various locations.

The first trim cover arrangement 28 is configured to form at least a portion of an exterior seating surface of the seat assembly 10. The trim cover arrangement 28 may include a trim cover 70 and a retaining feature 72.

The trim cover 70 may be made of any suitable material, such as fabric, vinyl, leather, or combinations thereof. Moreover, the trim cover 70 may include one or more layers. In addition, at least a portion of the trim cover 70 may be attached to the seat pad 26 in any suitable manner, such as with an adhesive, stitching, or fasteners.

The retaining feature 72 may have any suitable configuration. In the embodiment shown in FIG. 2, the retaining feature 72 is generally planar. The retaining feature 72 may be attached to an end portion 74 of the trim cover 70 in any suitable manner, such as with stitching, an adhesive, or sonic welding. Moreover, the retaining feature 72 may be attached to any part or side of the end portion 74. For example, the retaining feature 72 may be disposed proximate a first side of the end portion 74 such that the retaining feature 72 faces and/or contacts the air bag module 22 or a second side disposed opposite the first side such that the retaining feature 72 faces and/or contacts the bolster frame 24.

The retaining feature 72 may be at least partially disposed in the first gap 66 to help secure the trim cover 70 to the seat back 14. In at least one embodiment, the retaining feature 72 may engage or exert force against the first extension portion 48. As such, first trim cover arrangement 28 may be secured with or without the use of additional fasteners or an adhesive. Moreover, securing the first trim cover arrangement 28 in this manner may facilitate the positioning, fitting, and/or replacement of the trim cover 70.

The second trim pad arrangement 30, if provided, may also include a trim cover 80 that forms at least a portion of an exterior surface of the seat assembly 10 and a retaining feature 82. The retaining feature 82 may be attached to any part or side of an end portion 84 as previously described and may be disposed in the second gap 68 and engage or exert force against the second extension portion 50 to help secure the trim cover 80 to the seat back 14. In addition, a second end 86 of the trim cover 80 may be coupled to a component of the seat back 14 in any suitable manner. In the embodiment shown in FIG. 2, the second end 86 includes a bracket 88 that may be coupled to the frame 20 with or without any additional fasteners.

The seat back 14 may also include a back panel 32 having any suitable configuration. For example, the back panel 32 may wrap around the back and one or more sides of the seat assembly 10. The back panel 32 may be attached to the seat assembly 10 in any suitable manner, such as with hooks, fasteners, and/or an adhesive. The present invention also contemplates various embodiments that do not include a back panel. For instance, the second trim cover arrangement 30 may extend around at least a portion of the back and/or one or more sides of the seat. Moreover, a single trim cover arrangement may be provided that extends from one side of the air bag module 22 and around the seat back 14 to an opposite side of the air bag module 22 in one or more embodiments of the present invention.

Some additional embodiments of the present invention will now be described. For clarity, common reference numbers are used to designate components and features that are identical to or substantially similar to those previously described. These embodiments may employ any suitable seam portion and are not limited to the seam portion embodiment depicted. In addition, a seat assembly may be provided that includes any combination of the trim panel arrangement attachment features described below.

Figure 4:
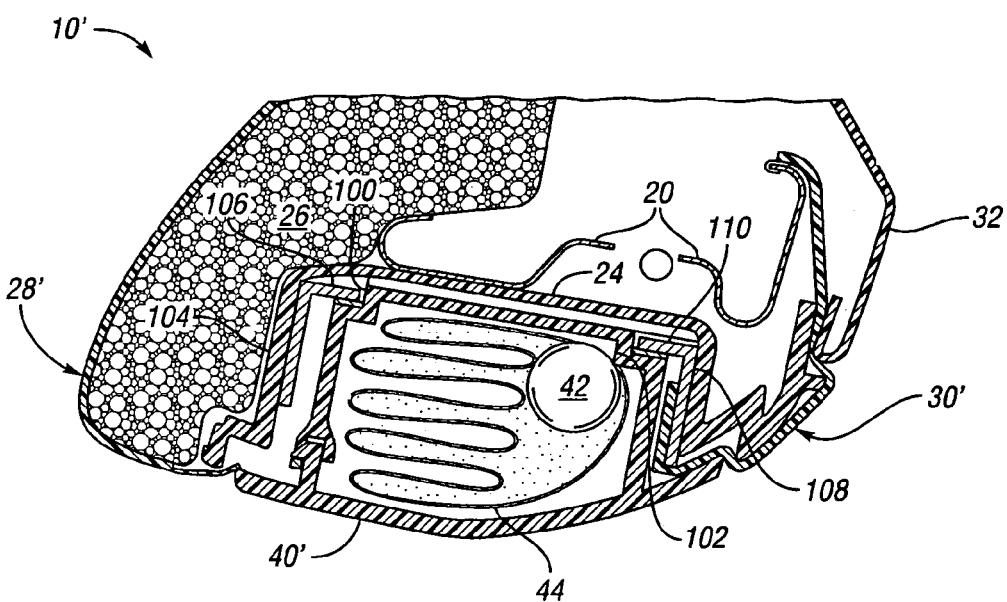
FIG. 4 is a fragmentary section view of a second embodiment of the invention.

Referring to FIG. 4, a second embodiment of a seat assembly 10' is shown. In this embodiment, the housing 40' may include one or more indented portions, such as first and second indented portions 100,102. The indented portions 100, 102 may be disposed in any suitable location, such as the proximate the side and/or back panels of the housing 40'. The first trim panel arrangement 28' may include a first retaining feature 104 having a hook portion 106. The second trim panel arrangement 30' may include a second retaining feature 108 having a hook portion 110. The hook portions 106,110 are adapted to engage the first and second indented portions 100,102, respectively, to help secure the first and second trim panel arrangements 28',30' to the seat assembly 10'.

Figure 5:
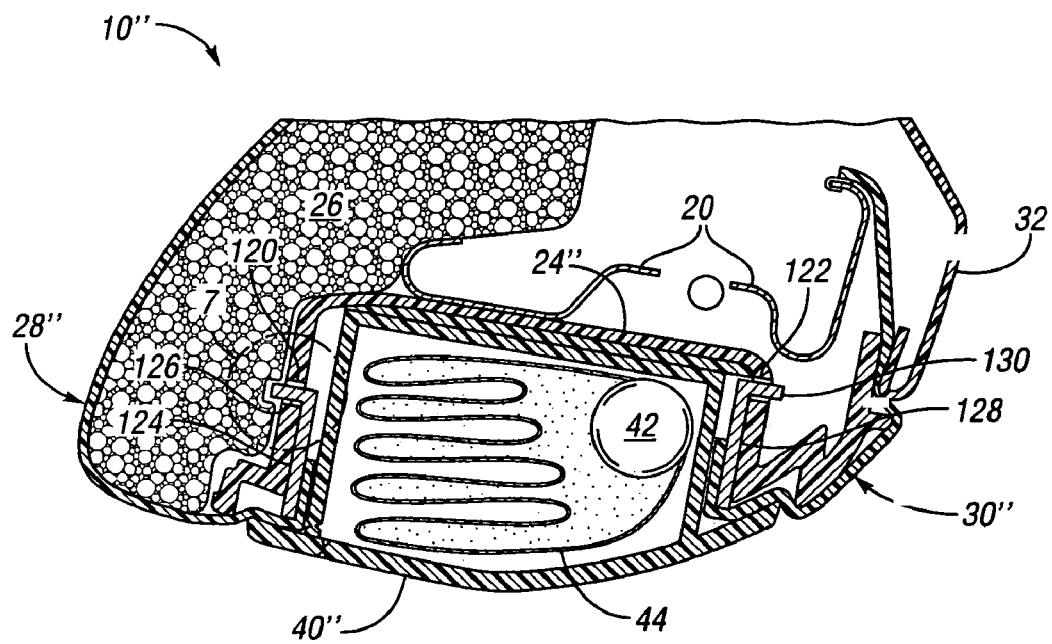
FIG. 5 is a fragmentary section view of a third embodiment of the invention.
Figure 7:
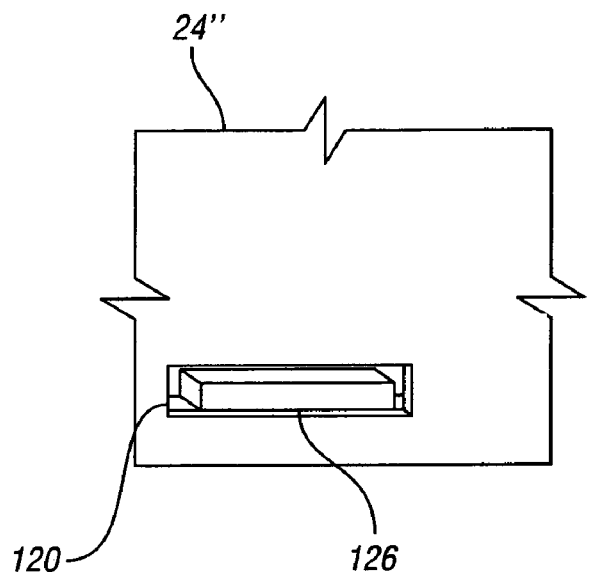
FIGS. 7 and 8 are magnified views of a portion of the seat back designated by line 7 of FIG. 5.
Figure 8:
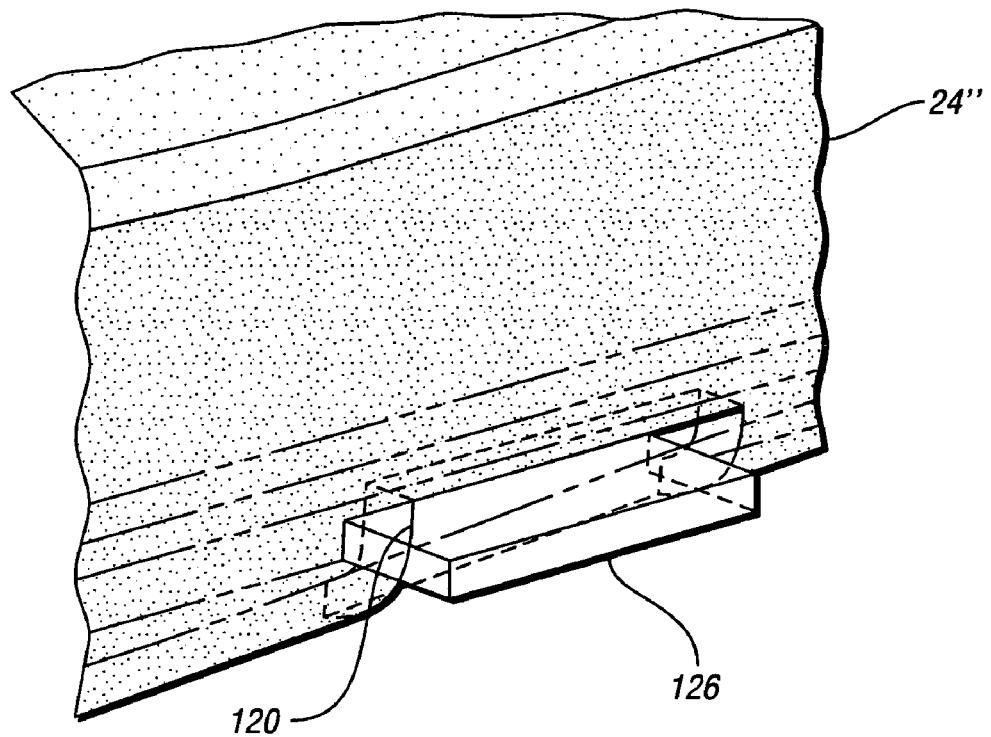

Referring to FIG. 5, a third embodiment of a seat assembly 10" is shown. In this embodiment, the bolster frame 24" may include one or more apertures, such as first and second apertures 120,122 that may be disposed in any suitable location. The first trim panel arrangement 28" may include a first retaining feature 124 having a hook portion 126. The second trim panel arrangement 30'' may include a second retaining feature 128 also having a hook portion 130. The hook portions 126,130 are adapted to engage the first and second apertures 120,122, respectively, to help secure the first and second trim panel arrangements 28'', 30''. The first and second apertures 120,122 may have any suitable configuration. For instance, the first and second apertures 120,122 may be disposed within the bolster frame 24'' as shown in FIG. 7 or may be disposed proximate an edge of the bolster frame 24'' as shown in FIG. 8.

Figure 6:
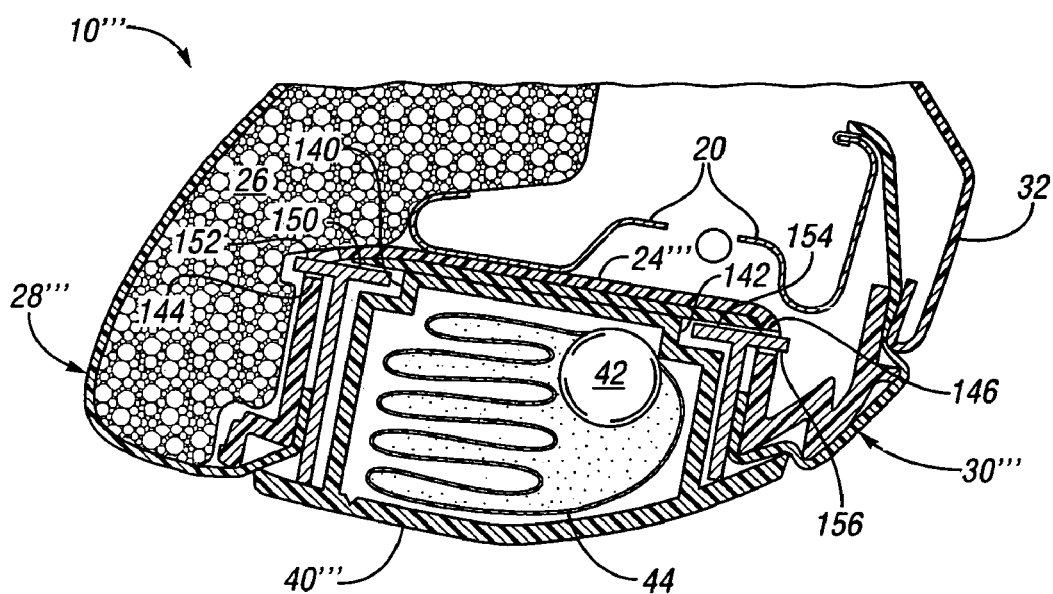
FIG. 6 is a fragmentary section view of a fourth embodiment of the invention.

Referring to FIG. 6, a fourth embodiment of a seat assembly 10''' is shown. In this embodiment, the housing 40''' includes first and second indented portions 140,142 and the bolster frame 24''' includes first and second apertures 144, 146. The apertures 144,146 may be disposed in any suitable location, such as within or proximate an edge of the bolster frame 24''' as previously described. The first and second trim panel arrangements 28''', 30''' may include retaining features having one or more hook portions. In the embodiment shown, the first retaining feature 28''' includes hook portions 150,152 that may extend in different directions. Similarly, the second retaining feature 30''' may include similar hook portions 154, 156. The hook portions 150,152 of the first retaining feature 28''' may be disposed in or engage the first indented portion 140 and the first aperture 144, respectively, to help secure the first trim panel arrangement 28'''. Similarly, the hook portions 154,156 of the second retaining feature 30''' may be disposed in or engage the second indented portion 142 and the second aperture 146, respectively, to help secure the second trim panel arrangement 30'''.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat assembly, comprising:
   a cushion assembly having a frame, a cushion, and a trim cover arrangement, the trim cover arrangement comprising:
   a trim cover disposed proximate the cushion, the trim cover having an end portion and a retaining feature disposed proximate the end portion, the retaining feature having first and second hook portions;
   a bolster frame disposed proximate the frame and having an aperture; and
   an air bag module disposed proximate the bolster frame, the air bag module and the bolster frame cooperating to define a gap;
   wherein the air bag module further comprises a housing having an indented portion; and
   wherein the air bag module does not extend through the bolster frame to secure the air bag module, the retaining feature is disposed in the gap to secure the trim cover arrangement, the first hook portion is disposed proximate the aperture, and the second hook portion is disposed proximate the indented portion to secure the trim cover arrangement.

2. The vehicle seat assembly of claim 1 wherein the air bag module further comprises an exterior panel that forms an exterior surface of the seat assembly, the exterior panel being adapted to open to facilitate deployment of an air bag.

3. The vehicle seat assembly of claim 2 wherein the exterior panel further comprises a seam portion that disengages in response to force exerted by the air bag when the air bag is inflated.

4. The vehicle seat assembly of claim 1 wherein the air bag module further comprises a housing having an extension portion that extends from the housing, the extension portion cooperating with the bolster frame to hold the retaining feature in the gap.

5. The vehicle seat assembly of claim 4 wherein the housing further comprises a side panel and the retaining feature contacts the extension portion and the side panel.

6. The vehicle seat assembly of claim 1 wherein the aperture extends through the bolster frame.

7. The vehicle seat assembly of claim 1 wherein the indented portion is located at a corner of the housing.

8. The vehicle seat assembly of claim 1 wherein the retaining feature contacts the housing and the bolster frame.

9. The vehicle seat assembly of claim 1 wherein bolster frame is disposed proximate the trim cover.

10. A vehicle seat assembly, comprising:
    a frame;
    a bolster frame disposed proximate the frame, the bolster frame having first and second portions;
    an air bag module disposed proximate the bolster frame, the air bag module cooperating with the first portion to define a first gap and cooperating with the second portion to define a second gap, wherein the air bag module does not extend through the bolster frame to secure the air bag module;
    a first trim cover arrangement having a first retaining feature disposed proximate an end portion of a first trim cover; and
    a second trim cover arrangement having a second retaining feature disposed proximate an end portion of a second trim cover;
    wherein the first retaining feature is disposed in the first gap to secure the first trim cover arrangement and the second retaining feature is disposed in the second gap to secure the second trim cover arrangement.

11. The vehicle seat assembly of claim 10 wherein the second trim cover arrangement further comprises a bracket disposed proximate a second end portion for securing the second trim cover arrangement to the frame.

12. The vehicle seat assembly of claim 10 further comprising a back panel disposed proximate the second trim cover arrangement.

13. The vehicle seat assembly of claim 10 wherein a portion of the second trim cover disposed between the end portion and a second end portion disposed opposite the end portion is supported by the bolster frame and forms an exterior seat surface.

14. The vehicle seat assembly of claim 10 wherein the bolster frame further comprises first and second apertures for receiving the first and second retaining features, respectively.

15. The vehicle seat assembly of claim 10 wherein the air bag module further comprises a housing having first and second indented portions disposed proximate the first and second retaining features, respectively.

16. A vehicle seat assembly, comprising:
    a frame;
    a bolster frame disposed proximate the frame, the bolster frame having a side portion;
    an air bag module disposed proximate the bolster frame, the air bag module cooperating with the side portion to define a gap and including an extension portion disposed adjacent to the gap; and a trim cover arrangement having a retaining feature disposed proximate an end portion of a trim cover;

wherein the retaining feature is disposed in the gap and exerts force directly on the extension portion to secure the trim cover arrangement.

17. The vehicle seat assembly of claim 16 wherein the retaining feature contacts the bolster frame and the trim cover contacts the air bag module.

18. The vehicle seat assembly of claim 16 wherein the retaining feature contacts the air bag module and the trim cover contacts the bolster frame.

19. The vehicle seat assembly of claim 16 wherein the retaining feature contacts the air bag module and the bolster frame and the trim cover contacts the bolster frame.

20. The vehicle seat assembly of claim 16 wherein the retaining feature and the trim cover both contact the air bag module and the bolster frame.

* * * * *